United States Patent
Critchley et al.

(10) Patent No.: US 7,406,820 B2
(45) Date of Patent: Aug. 5, 2008

(54) SYSTEM AND METHOD FOR TURBINE ENGINE ADAPTIVE CONTROL FOR MITIGATION OF INSTABILITIES

(75) Inventors: Ian L. Critchley, Phoenix, AZ (US); Bruce Anson, Scottsdale, AZ (US); Matthew C. Caspermeyer, Phoenix, AZ (US); Mike W. Scott, Spring, TX (US)

(73) Assignee: Honeywell International Inc., Morristown, NJ (US)

( * ) Notice: Subject to any disclaimer, the term of this patent is extended or adjusted under 35 U.S.C. 154(b) by 490 days.

(21) Appl. No.: 11/090,000

(22) Filed: Mar. 25, 2005

(65) Prior Publication Data

US 2006/0213200 A1    Sep. 28, 2006

(51) Int. Cl.
*F02C 9/28* (2006.01)
(52) U.S. Cl. .................... 60/39.281; 60/725
(58) Field of Classification Search ............. 60/39.281, 60/725, 734; 431/114
See application file for complete search history.

(56) References Cited

U.S. PATENT DOCUMENTS

| | | | |
|---|---|---|---|
| 4,546,426 A | 10/1985 | Hafner et al. | |
| 4,914,564 A | 4/1990 | Surauer et al. | |
| 5,274,996 A | 1/1994 | Goff et al. | |
| 5,428,951 A | 7/1995 | Wilson et al. | |
| 5,445,517 A | 8/1995 | Kondou et al. | |
| 5,544,478 A | 8/1996 | Shu et al. | |
| 5,575,144 A | 11/1996 | Brough | |
| 5,797,266 A * | 8/1998 | Brocard et al. | 60/725 |
| 5,809,769 A | 9/1998 | Richards et al. | |
| 6,038,540 A | 3/2000 | Krist et al. | |
| 6,205,765 B1 | 3/2001 | Iasillo et al. | |
| 6,240,324 B1 | 5/2001 | Preska et al. | |
| 6,464,489 B1 | 10/2002 | Gutmark et al. | |
| 6,522,991 B2 * | 2/2003 | Banaszuk et al. | 702/138 |
| 6,530,228 B2 | 3/2003 | Wilson et al. | |
| 6,725,103 B2 | 4/2004 | Shigemasa et al. | |
| 2002/0177909 A1 | 11/2002 | Fu et al. | |

* cited by examiner

*Primary Examiner*—L. J. Casaregola
(74) *Attorney, Agent, or Firm*—Ingrassia, Fisher & Lorenz, P.C.

(57) ABSTRACT

The present invention provides an adaptive combustion controller and method for a turbine engine. The adaptive combustion controller and method modulates the fuel flow to the turbine engine combustor to reduce combustion instabilities. In particular, the adaptive combustion controller includes a fuel flow phase controller and a fuel flow magnitude controller. The adaptive combustion controller receives sensor data from the turbine engine. In response to the sensor data the fuel flow phase controller adjusts the phase of the modulated fuel flow to reduce instabilities in the combustor. Likewise, in response to the sensor data the fuel flow magnitude controller adjusts the magnitude of the modulated fuel flow to further reduce the instabilities in the combustor. By modulating the fuel flow to the combustor, and adaptively adjusting the phase and magnitude of the modulated fuel flow, the adaptive combustion controller is able to effectively reduce combustion instabilities.

11 Claims, 11 Drawing Sheets

| TIME (SEC) | STATE |
|---|---|
| 0 | 1 |
| 2 | 1 |
| 2 | 2 |
| 4 | 2 |
| 4 | 3 |
| 6 | 3 |
| 6 | 4 |
| 6.0004 | 4 |
| 6.0004 | 5 |
| 8.0004 | 5 |
| 8.0004 | 6 |
| 10.0004 | 6 |
| 10.0004 | 7 |
| 12.0004 | 7 |
| 12.0004 | 8 |
| 12.0008 | 8 |
| 12.0008 | 1 |

| CASE | 3 POINT PERTURBATION PROFILE | NEGATIVE PERTURBATION | POSITIVE PERTURBATION | ADAPTIVE PARAMETER DECISION |
|---|---|---|---|---|
| 1 | | + | + | INCREASE |
| 2 | | − | − | DECREASE |
| 3 | | − | + | NO CHANGE |
| 4 | | + | − | NO CHANGE |

FIG. 11  1100

SYSTEM AND METHOD FOR TURBINE ENGINE ADAPTIVE CONTROL FOR MITIGATION OF INSTABILITIES

FIELD OF THE INVENTION

This invention generally relates to turbine engines, and more specifically relates to control systems for turbine engines.

BACKGROUND OF THE INVENTION

Turbine engines are widely used for a variety of purposes. For example, turbine engines are commonly used as propulsion engines in aircraft and other large vehicles. Turbine engines are also used in power generation. For example, turbine engines are commonly used as auxiliary power units in aircraft to supply electric power and compressed air. Large turbine engines are also used in power plants for electricity generation. In all applications the reliability and performance of the turbine engine is of critical importance.

One issue in turbine engine performance and reliability is the risk of combustion driven instabilities. In particular, oscillations of pressure in the turbine engine combustor can create control problems and possibly lead to turbine engine damage if allowed to continue. One cause of combustion driven instabilities is the natural resonance of the combustor. Natural pressure ripples in the combustor can feedback into the fuel system. This causes variations in the fuel flow to the combustor, which in turn causes the flame in the combustor to modulate, creating more pressure ripples. In some circumstances the natural resonant frequencies of the system will cause these pressure oscillations to constructively reinforce, leading to a potentially unacceptable level in pressure oscillations. This condition is commonly referred to as combustion instabilities or combustion dynamics. These types of combustion instabilities are particularly problematic in gaseous fuel turbine engines that are operated at high efficiency and low emission levels but can also exist in liquid fueled turbine engines.

Previous methods of compensating for these combustion instabilities have been limited. For example, some techniques have simply changed the power level of the turbine engine to move operation from frequencies that lead to instabilities. Unfortunately this is not an acceptable solution for applications where the power output of the turbine engine must be tightly controlled for efficiency or low emission purposes.

BRIEF SUMMARY OF THE INVENTION

The present invention provides an adaptive combustion controller and method for a turbine engine. The adaptive combustion controller and method modulates the fuel flow to the turbine engine combustor to reduce combustion instabilities. In particular, the adaptive combustion controller includes a fuel flow phase controller and a fuel flow magnitude controller. The adaptive combustion controller receives sensor data from the turbine engine. In response to the sensor data the fuel flow phase controller adjusts the phase of the modulated fuel flow to reduce instabilities in the combustor. Likewise, in response to the sensor data the fuel flow magnitude controller adjusts the magnitude of the modulated fuel flow to further reduce the instabilities in the combustor. By modulating the fuel flow to the combustor, and adaptively adjusting the phase and magnitude of the modulated fuel flow, the adaptive combustion controller is able to effectively reduce combustion instabilities in the turbine engine. Furthermore, the adaptive combustion controller is able to modulate the fuel flow without changing the overall amount of fuel delivered to the turbine engine. Thus, the adaptive combustion controller is able to reduce combustion instabilities without requiring a change in fuel consumption or engine speed of the turbine engine. The adaptive combustion controller may be applied to turbine engines fueled with liquid or gaseous fuels.

In one embodiment the fuel flow phase controller calculates the cost of increasing delay in the phase of the modulated fuel flow and calculates the cost of decreasing the delay in the phase of the fuel flow. These costs are then compared to the cost of the current delay to determine what change, if any, is desirable in the phase of the modulated fuel flow. Likewise, the fuel flow magnitude controller calculates the cost of increasing a magnitude of the modulated fuel flow and calculates the cost of decreasing the magnitude of the modulated fuel flow. These costs are then compared to the cost of the current magnitude to determine what change, if any, is desirable in the magnitude of the modulated fuel flow. This process is continued adaptively using new sensor data to continually and effectively reduce combustion instabilities. This adaptive combustion controller is particularly applicable to turbine engines that use gaseous fuels such as natural gas and are operated at very low emission levels.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and:

FIG. 10 is a table of an exemplary state timing procedure; and

FIG. 11 is a table of an exemplary decision matrix.

DETAILED DESCRIPTION OF THE INVENTION

The present invention provides an adaptive combustion controller and method for a turbine engine. The adaptive combustion controller and method modulates the fuel flow to the turbine engine combustor to reduce combustion instabilities.

Figure 1:
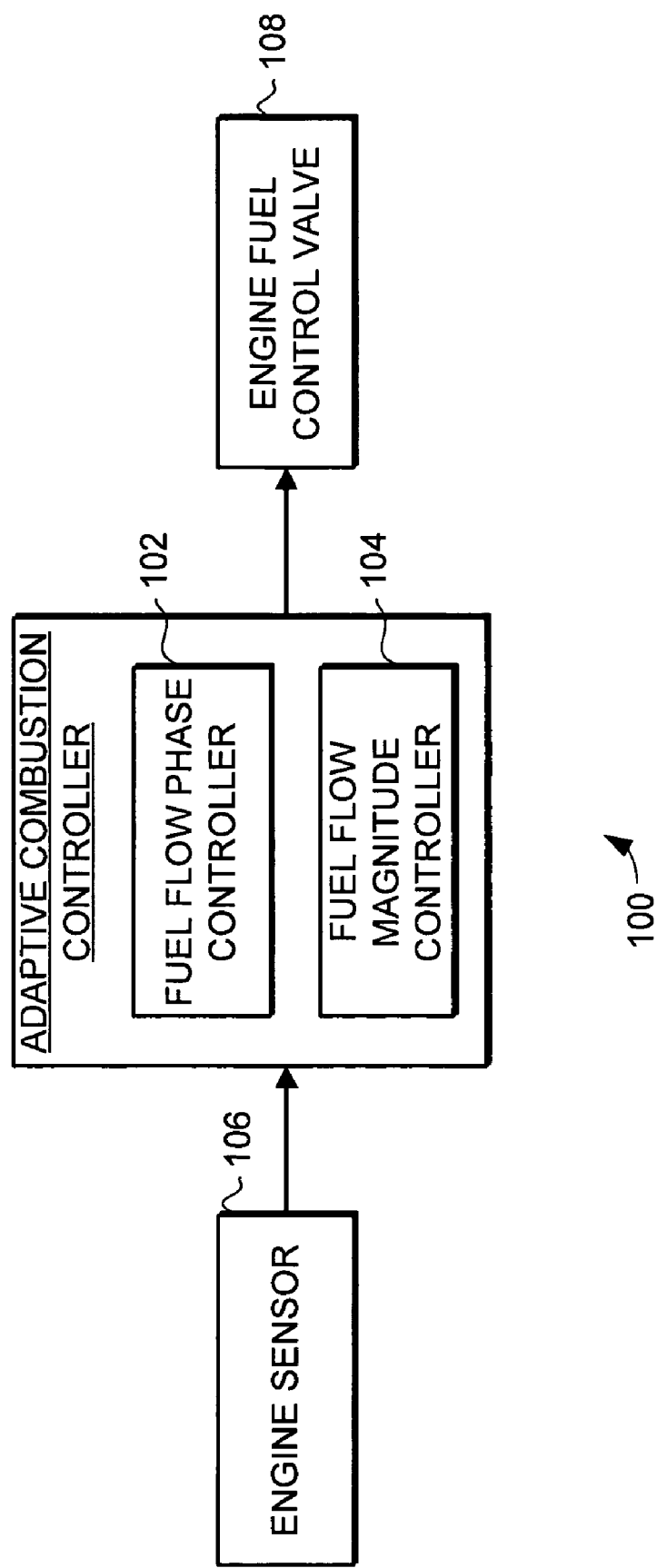
FIG. 1 is a schematic view of an adaptive combustion controller.

Turning now to FIG. 1, an adaptive combustion controller 100 is illustrated schematically. The adaptive combustion controller 100 includes a fuel flow phase controller 102 and a fuel flow magnitude controller 104. The adaptive combustion controller receives sensor data from an engine sensor 106. The adaptive combustion controller 100 modulates the fuel flow by adaptively controlling an engine fuel control valve 108 to reduce combustion instabilities. Specifically, in response to the sensor data the fuel flow phase controller 102 adjusts the phase of the modulated fuel flow to reduce instabilities in the combustor. Likewise, in response to the sensor data the fuel flow magnitude controller 104 adjusts the magnitude of the modulated fuel flow to further reduce the instabilities in the combustor. By modulating the fuel flow to the combustor, and adaptively adjusting the phase and magnitude of the modulated fuel flow, the adaptive combustion controller 100 is able to effectively reduce combustion instabilities in the turbine engine. Furthermore, the adaptive combustion controller 100 is able to modulate the fuel flow without changing the overall amount of fuel delivered to the turbine engine. Thus, the adaptive combustion controller 100 is able to reduce combustion instabilities without requiring a change in fuel consumption or engine speed of the turbine engine.

In one embodiment the fuel flow phase controller 102 calculates the cost of increasing delay in the phase of the modulated fuel flow and calculates the cost of decreasing the delay in the phase of the fuel flow. These costs are then compared to the cost of the current delay to determine what change, if any, is desirable in the phase of the modulated fuel flow. Likewise, the fuel flow magnitude controller 104 calculates the cost of increasing a magnitude of the modulated fuel flow and calculates the cost of decreasing the magnitude of the modulated fuel flow. These costs are then compared to the cost of the current magnitude to determine what change, if any, is desirable in the magnitude of the modulated fuel flow. This process is continued adaptively using new sensor data to continually and effectively reduce combustion instabilities. This adaptive combustion controller 104 is particularly applicable to turbine engines that use gaseous fuels such as natural gas and are to be operated at very low emission levels.

Figure 2:
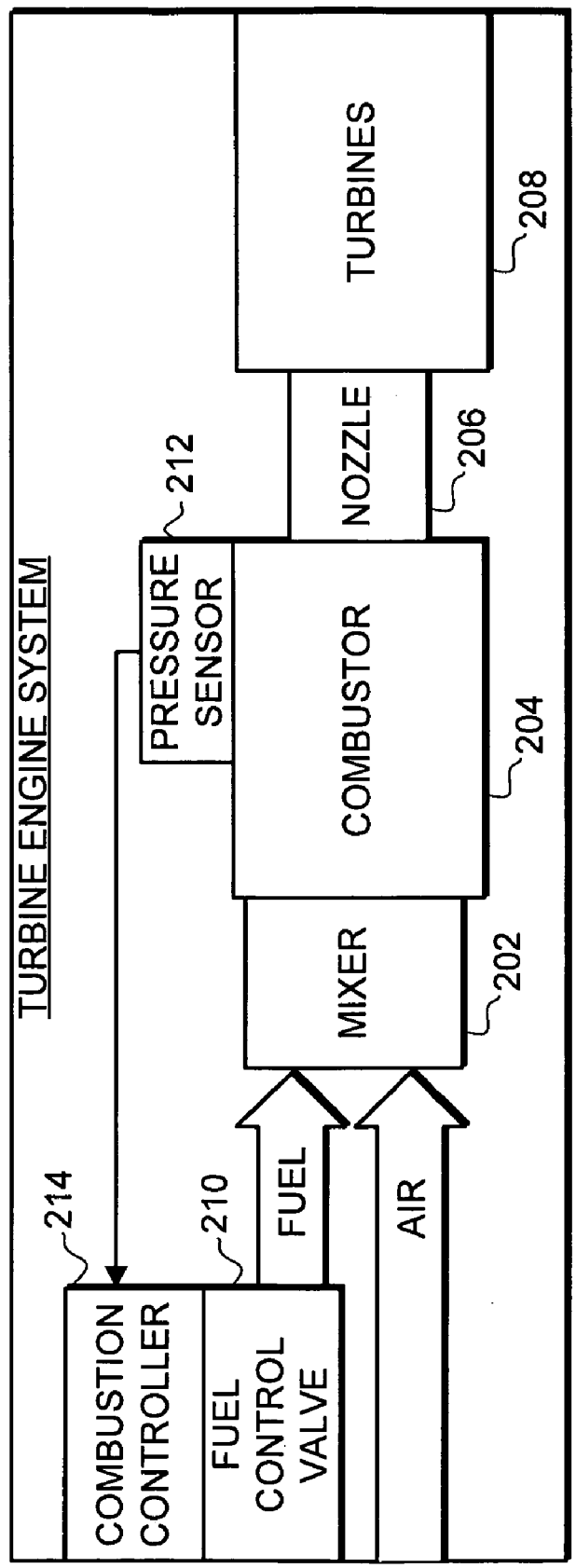
FIG. 2 is a schematic view of an exemplary turbine engine system.

Turning now to FIG. 2, a schematic view of a turbine engine system 200 is illustrated. The turbine engine system 200 is illustrated broadly and is meant to represent the general features of turbine engines. The turbine engine system 200 includes a fuel and air mixer 202, a combustor 204, a nozzle 206 turbines 208 and fuel control valve 210. Again, this is a very simplified example of a typical turbine engine. Fuel is provided by the fuel control valve 210 to the mixer 202, where the fuel is mixed with air and delivered to the combustor 204. The fuel/air mixture is ignited inside the combustor 204, causing an increase in temperature of the gases delivered to the turbines 208 through nozzle 206. This causes the turbines to rotate, thus generating power that can be used for a variety of purposes. It should be noted that not all turbine engines include all the features illustrated in FIG. 2. For example, some turbine engines may not include mixer 202. The embodiments of the invention could be applied to any type of turbine engine, whether or not it includes all the features illustrated in FIG. 2.

As discussed above, one issue in turbine engine performance and reliability is the risk of combustion driven instabilities. In particular, oscillations of pressure in the turbine engine combustor can create control problems, limit power and possibly lead to turbine engine damage if allowed to continue. One cause of these problems is the natural resonance of the combustor 204. Specifically, natural pressure ripples in the combustor 204 can feedback into the fuel or air supply system. This causes variations in the fuel flow to the combustor 204, or variations in the fuel-air mixture to the combustor 204, which in turn cause the flame in the combustor 204 to modulate, creating more pressure ripples. In some circumstances the natural resonant frequencies of the system will cause these pressure oscillations to constructively reinforce, leading to a potentially unacceptable level in pressure oscillations, commonly called combustion instabilities.

In accordance with the embodiments of the invention a combustion controller 214 is implemented as part of the turbine engine system to reduce these combustion instabilities. In this illustrated example the combustion controller 214 receives sensor data from a pressure sensor 212. The pressure sensor 212 measures the pressure in the combustor 204 and provides that data to the combustion controller 214. In response, the combustion controller 214 modulates the fuel flow by adaptively controlling fuel control valve 210 to reduce combustion instabilities. Specifically, in response to the pressure sensor data the combustion controller 214 adjusts the magnitude and phase of the modulated fuel flow to reduce instabilities in the combustor.

Figure 3:
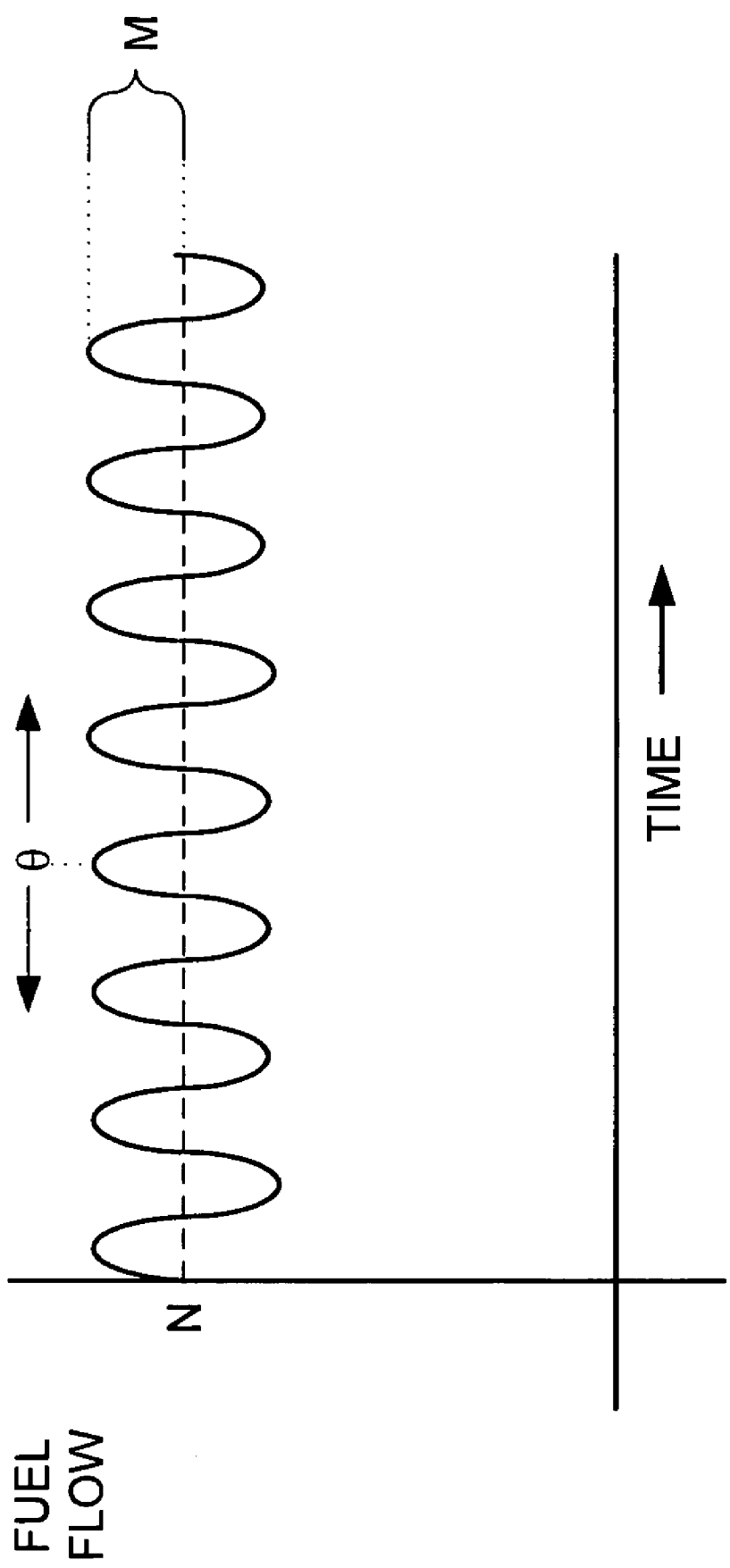
FIG. 3 is an exemplary graph of a modulated fuel flow.

Turning now to FIG. 3, a graph 300 illustrates a modulated fuel flow that can be adaptively controlled to reduce instabilities in the turbine engine combustor. The fuel flow requirements in a turbine engine are typically determined by the required power output of the engine or other operational parameters. For example, a turbine engine used in aircraft propulsion has its fuel flow determined by propulsion requirements. Likewise, in turbine engines used for power generation the power level is determined by the required output of electric power. Other restraints on fuel flow include limitations on emissions. For example, in some turbine engines it is desirable or necessary to operate the turbine engine at fuel flow levels that minimize pollution and/or maximize efficiency. In these types of systems the fuel flow levels are determined by operational requirements of the system.

The embodiments of the invention provide the ability to reduce combustion instabilities while still providing the fuel flow needed to meet operational requirements. In FIG. 3, the graph 300 illustrates how modulated fuel flow provides the needed fuel flow while meeting operational requirements. In the illustrated example the required fuel flow is a net fuel flow N. The effect of fuel flow modulation is to superimpose a periodic variability over a constant level of the fuel flow. This periodic variability has a frequency F, a phase $\theta$ and a magnitude M. The frequency, phase and magnitude of the modulation can be changed without affecting the overall net level of fuel flow that is delivered to the turbine engine. Specifically, when the frequency of the modulation is sufficiently high, the turbine engine operates as if a constant level of fuel flow at the net value N is delivered. Thus, the modulation of the fuel flow can be adaptively controlled to effectively reduce combustor instabilities in the system while the net amount of fuel flow is maintained at a level that meets operational requirements of the system.

Figure 4:
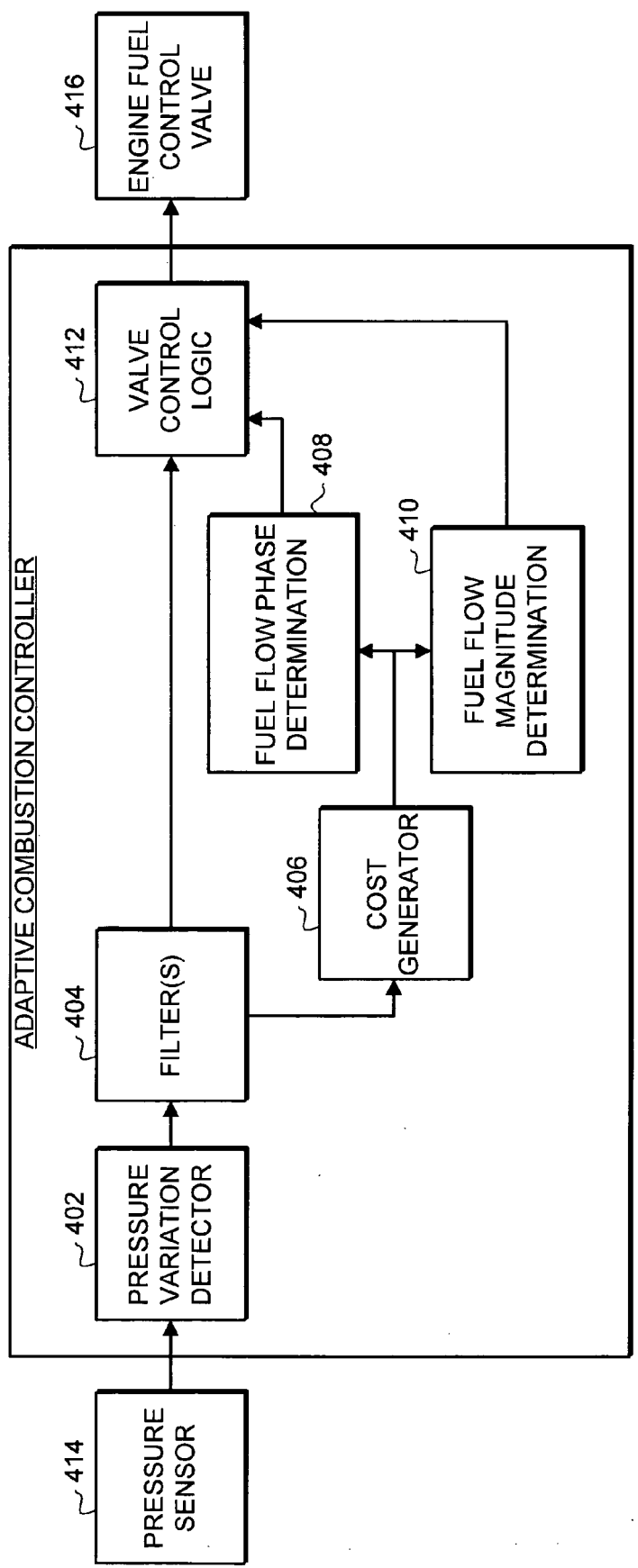
FIG. 4 is a schematic view of an exemplary embodiment of an adaptive combustion controller.

Turning now to FIG. 4, an exemplary adaptive combustion controller 400 is illustrated schematically. The adaptive combustion controller 400 is one example of the type of combustion controller that can be adapted to reduce combustion instabilities in a turbine engine. The combustion controller 400 includes a pressure variation detector 402, filters 404, a cost generator 406, fuel flow phase determination 408, fuel flow magnitude determination 410 and valve control logic 412. The combustion controller 400 receives pressure data from a pressure sensor 414 and controls an engine fuel control valve 416 to reduce combustion instabilities in a turbine engine. Specifically, the combustion controller 400 modulates the fuel flow by adjusting the phase and magnitude of the modulated fuel flow to reduce instabilities in the combustor.

During operation the pressure variation detector 402 receives pressure data from the pressure detector 414. From the pressure data the pressure variation detector 402 generates a pressure error signal that represents the pressure variations that are occurring at higher frequencies. The pressure error signal is passed to the filters 404 that are used to filter the error signals, which are then passed to the valve control logic 412. At the valve control logic 412 the filtered signals are phase and magnitude adjusted, and then used to control the engine fuel control valve 416 in a way that will reduce combustion instabilities.

As will be described in greater detail below, in one embodiment the filters 404 and valve control logic 412 will include multiple separate paths, with each path corresponding to a distinct frequency of pressure variation. In some combustion systems instabilities may occur at multiple different frequencies. For example, the combustion instabilities may occur at different frequencies for different operating conditions. As another example, in some cases combustion instabilities of multiple frequencies may occur simultaneously at one operating condition. In these applications separate filter paths can be used to isolate separate frequencies of disturbances, which can then be collectively minimized by the valve control logic 412. Specifically, separate paths for each measured frequency of instability in the pressure disturbance waveform allow the generation of a fuel flow command that is specifically destructive to multiple frequency components of the pressure disturbance waveform. When the multiple frequency paths are combined, then the new fuel flow waveform will create a pressure disturbance that destructively cancels the existing pressure disturbance waveform at each frequency included in the combined fuel flow command.

A pressure variation signal is also passed from the filters 404 to the cost generator 406. The cost generator 406 generates a cost metric from the pressure variation signal. The cost is a measure of the acoustic instabilities derived from the pressure variation. The functions used to generate the cost would depend on the details of each application. In general, the cost functions used would be selected to scale the measure such that instabilities can be effectively reduced to a point where they are no longer problematic.

The cost generated by the cost generator 406 is passed to the fuel flow phase determination 408 and the fuel flow magnitude determination 410, which in turn operate the valve control logic 412. In one embodiment the fuel flow phase determination 408 alternatively increases and decreases the delay in the phase of the modulated fuel flow. The resulting costs of the decreasing and increasing delays are compared with the current delay cost to determine what change, if any, is desirable in the phase of the modulated fuel flow. Likewise, the fuel flow magnitude determination 410 alternatively increases and decreases the magnitude of the modulated fuel flow. The resulting costs of increasing and decreasing the magnitude are compared to the current magnitude cost to determine what change, if any, is desirable in the magnitude of the modulated fuel flow. This process is continued adaptively using new sensor data and recalculated costs to continually and effectively reduce combustion instabilities.

Figure 5:
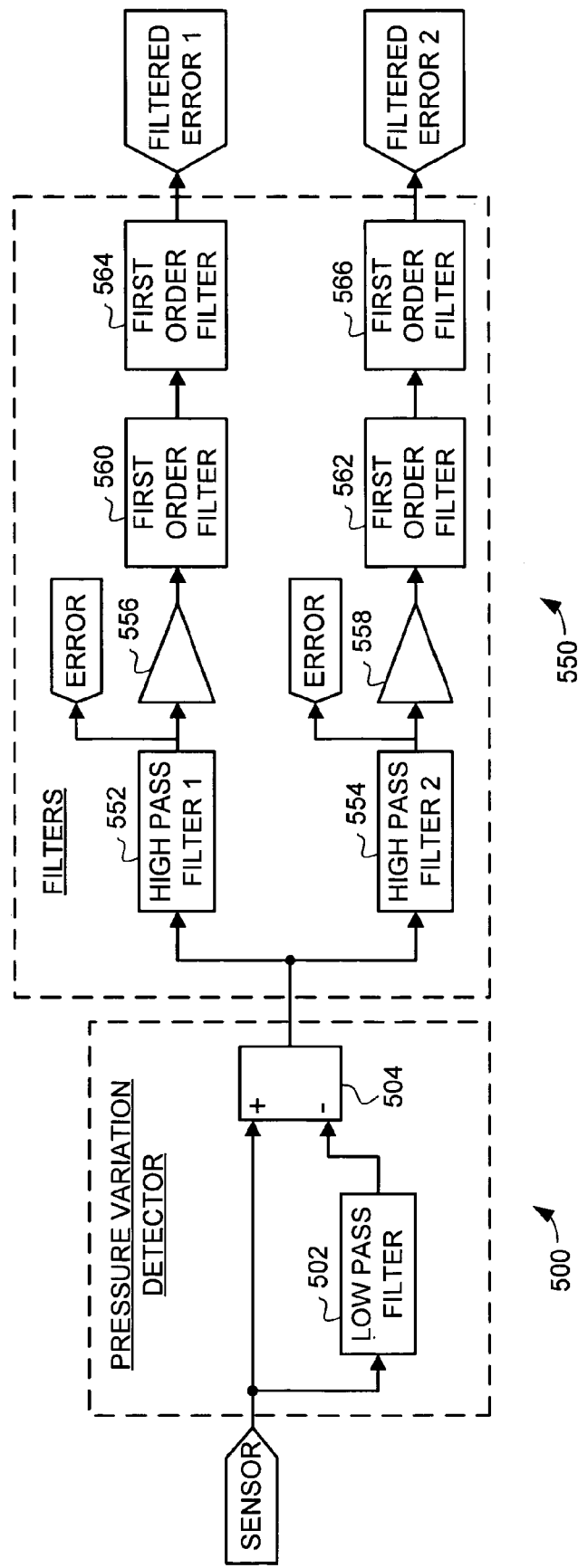
FIG. 5 is a schematic view of an exemplary embodiment of a pressure variation detector and filters.

Turning now to FIG. 5, an exemplary pressure variation detector 500 and filters 550 are illustrated schematically. The pressure variation detector 500 and filters 550 are one example of the type of devices that can be used in the combustion controller 400. The pressure variation detector 500 includes a low pass filter 502 and summing junction 504. This effectively eliminates the steady content from the pressure disturbance which is not required by the adaptive controller. What remains is the variable content of the pressure disturbance, the key information needed to determine the effectiveness of the current adaptive delay and magnitude as well as to generate the fuel flow command waveform that cancels the pressure disturbance.

The low pass filter 502 receives pressure sensor data and removes the high frequency variations. The resulting signal is then subtracted from the pressure sensor data by the summing junction 504. This results in a pressure error signal that represents the varying content of the pressure variations that are occurring in the combustion chamber. In one embodiment the low pass filter 502 comprises a filter selected to eliminate frequencies beyond a specified range. For example, to remove higher frequencies that cannot be effectively cancelled due to the frequency response characteristics of the engine fuel control valve 416.

The pressure error signal is passed to the filters 550 that are used to filter the error signals. The filters 550 include two separate paths, with each path corresponding to a distinct frequency of pressure variation. In this embodiment the separate filter paths are used to isolate separate frequencies of disturbances, which can then be collectively minimized by the valve control logic. Specifically, the first path includes high pass filter 552, gain amplifier 556, first order filter 560 and first order filter 564. Likewise, the second path includes high pass filter 554, gain amplifier 558, first order filter 562 and first order filter 566. The specific filters used would depend upon the turbine engine application. Typically, the natural resonant frequencies of the combustor in the turbine engine would be determined experimentally. With those resonant frequencies determined one path would be implemented for each separate resonant frequency of concern. It should be noted that while filters 550 illustrate two paths for two resonant frequencies in some applications additional filter paths for additional frequencies would preferably be included. Conversely, a single filter path could be implemented for applications where only one resonant frequency is of concern, or where all frequencies of interest are in a relatively narrow frequency range.

As one example implementation the first filter path can be implemented for disturbance frequencies of 300 Hz, and the second path can be implemented for frequencies of 90 Hz. In this application the high pass filter 552 would comprise a filter that screens frequencies below 300 Hz and the high pass filter 554 would comprise a filter that screens frequencies below 90 Hz. The first order filter 560 and the first order filter 564 can comprise filter designs that attenuate the signal further such that the output of first-order filter 564 is of the appropriate waveform to cancel the disturbance at 300 Hz (if it is phase shifted and amplified correctly). Likewise, the first order filter 562 and first order filter 566 can perform the same function at 90 Hz. This combination of filters results in two filtered error signals, with the first filtered error signal corresponding to acoustic disturbances of around 300 Hz and the second filtered error signal corresponding to disturbances of around 90 Hz.

Thus, the filters 550 provide two filtered error signals, each corresponding to a different range of acoustic disturbances. These two signals will be combined in the valve control logic and used to generate a command signal for the control valve. Additionally, the filters 550 provide error signals that can be used together to generate the cost metric that is a function of both frequencies, or separately to generate a cost metric for one of the frequencies individually.

Figure 6:
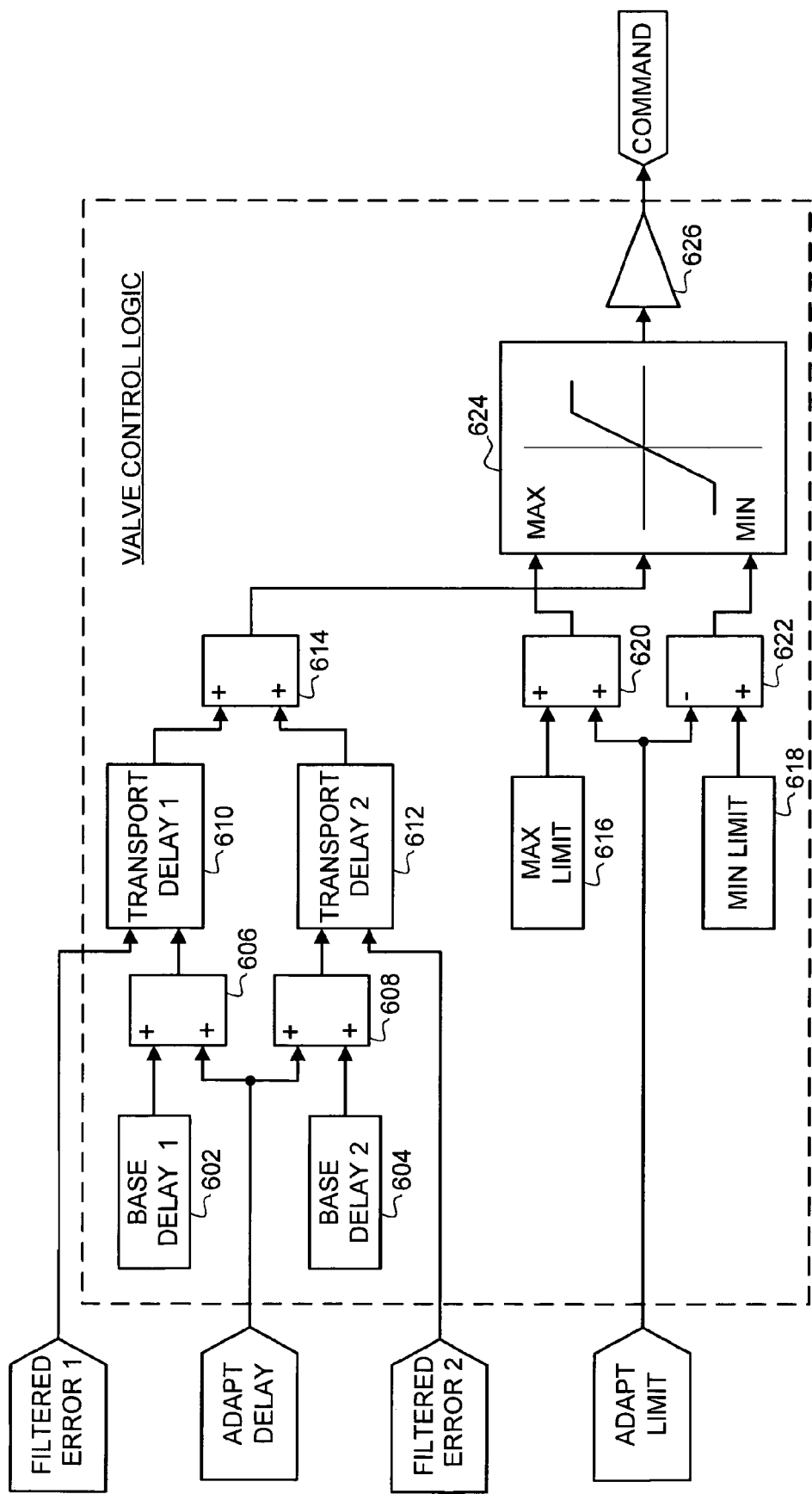
FIG. 6 is a schematic view of an exemplary embodiment of valve control logic.

Turning now to FIG. 6, exemplary valve control logic 600 is illustrated schematically. The valve control logic 600 is exemplary of the type of logic that can be used in combustion controller 400. The valve control logic 600 receives the filtered error signals 1 and 2 from the filters. Additionally, the valve control logic receives an adapt delay signal from a fuel flow phase determination and adapt limit signal from a fuel flow magnitude determination, which will be discussed in greater detail below. In general the filtered error signals received by the valve control logic 600 are phase adjusted, summed, limit adjusted and then used as a command signal to control the fuel control valve in a way that will reduce combustion instabilities.

The valve control logic 600 includes a base delay 602, base delay 604, summing junctions 606, 608, 614, 620, and 622, transport delay 610, transport delay 612, max limit 616, max limit 618, range limiting device 624, and gain amplifier 626.

The transport delay 610 delays the filtered error signal 1 by an amount specified by the output of summing junction 606. The output of the summing junction 606 is determined by the base delay 602 and the adapt delay signal. Specifically, the base delay 602 provides a base delay level that is used to provide a neutral amount of delay. The adapt delay signal provides a variable delay that is used to adjust the phase of signal. Specifically, the adapt delay signal is used to adjust the delay from the base delay amount, either increasing or decreasing the delay by a specified amount. For example, when the adapt delay is a positive value the summing junction 606 results in the total delay being specified adapt delay value greater than the base delay. When the adapt delay is a negative value the summing junction 606 results in a total delay being a specified amount less than the base delay. Thus, the delay can be increased or decreased from the base delay, in an amount specified by the adapt delay signal. The base amount is preferably selected to be greater than any foreseeable amount of adapt delay. Otherwise a large negative adapt delay could result in a negative total delay, something that cannot be implemented by the transport delay 610 (as a transport delay of 0 effectively eliminates the transport delay).

The base delay 604, summing junction 608, and transport delay 612 functions in a similar manner for the filtered error 2 signal. Thus, transport delay 612 delays the filtered error signal 2 by an amount specified by the summing junction 608, which is the sum of the base delay 604 and adapt delay signal. Adjusting the delays of the filtered error signals effectively changes the phase of those signals, and thus is used to change the phase of the modulated fuel flow.

The outputs of transport delay 610 and transport delay 612 are summed together in summing junction 614. Thus, the summing junction 614 output comprises the sum of the phase adjusted filtered error 1 and filtered error 2 signals. This output is passed to the range limiting device 624. The range limiting device 624 selectively clamps the signal, effectively adjusting the magnitude of the signal, before outputting the signal through amplifier 626. This is used to change the magnitude of the modulated fuel flow.

The amount of clamping and hence the magnitude level of the signal is determined by the adapt limit signal, through summing junctions 620 and 622. The output of the summing junction 620 is determined by the max limit 616 and the adapt limit. Specifically, the max limit 616 specifies the nominal maximum level of voltage in the signal that is passed through the range limiting device 624. The adapt limit signal is used to adjust the upper limit from the nominal maximum level. Likewise, the min limit 618 specifies the minimum level of voltage in the signal, and is also adjusted using the adapt limit signal. Thus, the magnitude of the signal can be increased or decreased from the nominal limits, in an amount specified by the adapt limit signal.

Thus, the valve control logic 600 receives the filtered error signals 1 and 2 and phase adjusts, sums, and limit adjusts the error signals. The resulting outputs are then used as a command signal for the fuel control valve. The fuel control valve would be selected to have frequency response characteristics such that it is able to supply the commanded fuel flow. As one example, it is desirable that the fuel control valve be able to follow the commanded fuel flow with only −3 dB of attenuation at some target frequency. This target frequency typically needs to be sufficiently higher than the maximum frequency of the pressure disturbance that we are trying to destructively eliminate.

As will be explained below, the adapt delay and adapt limit signals are produced by the fuel flow phase determination and fuel flow magnitude determination such that those signals will drive the command signal to reduce combustion instabilities in the system.

Figure 7:
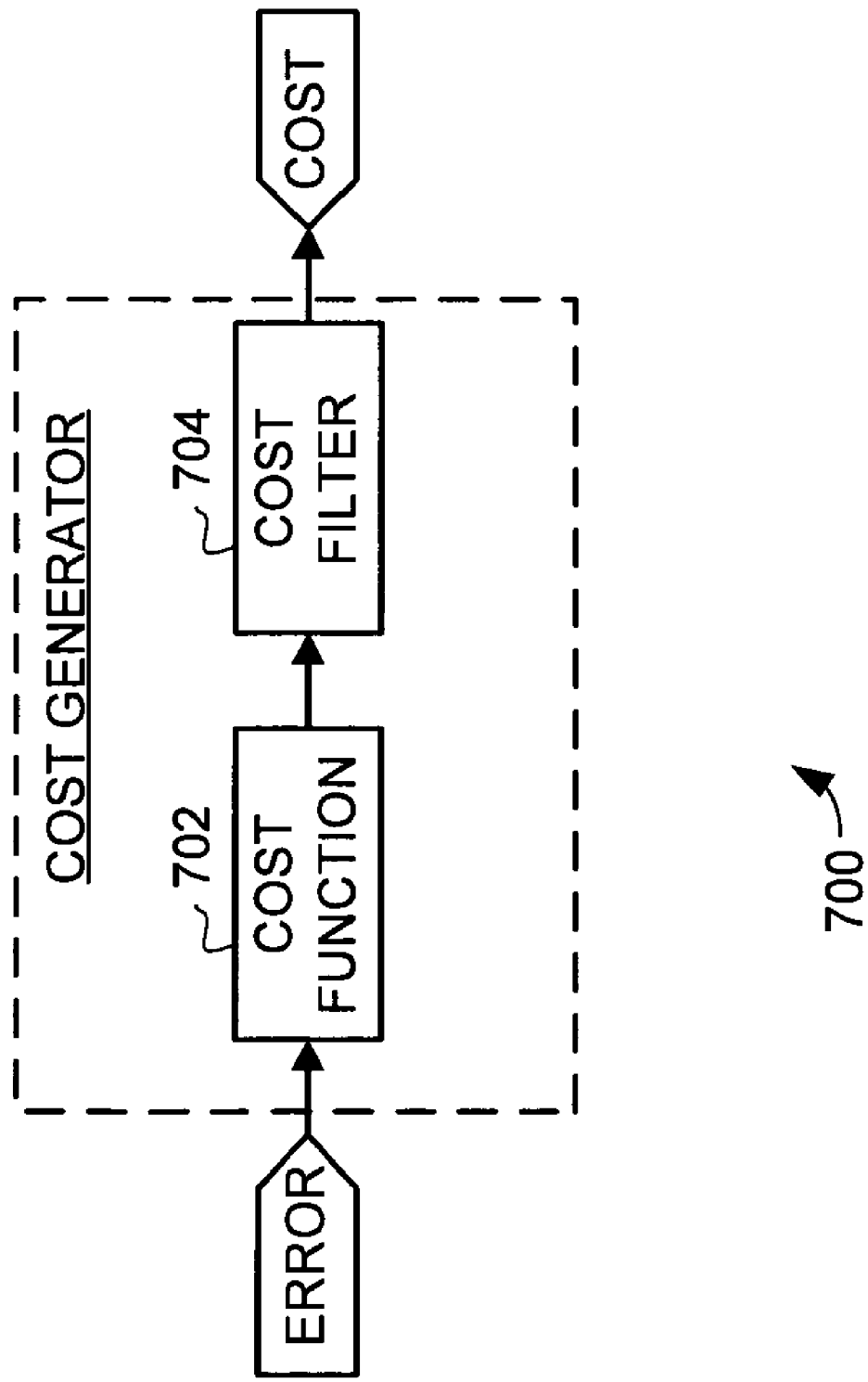
FIG. 7 is a schematic view of an exemplary embodiment of a cost generator;.

Turning now to FIG. 7, an exemplary cost generator 700 is illustrated. The cost generator 700 is exemplary of the type of generator that can be used in combustion controller 400. The cost generator includes a cost function 702 and a cost filter 704. The cost generator 700 generates a cost metric from the pressure variation signal, with the cost metric providing a measure of the acoustic instabilities in the system. The cost function 702 is selected to appropriately scale the measure of instabilities in a way that facilitates adaptive reduction of those instabilities. For example, the cost function 702 can be selected to increase the resolution at all levels of instabilities. One exemplary function that can be used is an absolute value function followed by an anti-log base 10 function. This implementation results in increased resolution of the cost for all levels of instabilities, including low levels of instabilities, while maintaining effective scaling. Another function that can be used is a simple square function, although this cost function has the disadvantage of making values between 0 and 1 reduced, making it harder to ascertain the effectiveness of the adjusted delays and limits if the value falls within this range. In either case, the cost function 702 is applied to the error signal, resulting in a cost metric that is an effective measure of the instabilities in the system. The cost is then filtered by the cost filter 704. The cost filter 704 would preferably be selected to complement the cost function 702. As an example, when the cost function is an anti-log base 10 function, the cost filter can comprise a filter that attenuates the signal to allow easier analysis of the value for determination of the effectiveness of the adjusted delay and limits. This cleans the signal so that the algorithms can determine if they are affecting the pressure instability. As will be explained in greater detail below, the resulting cost is used to determine whether to increase or decrease the phase and magnitude of the fuel flow modulation.

Figure 8:
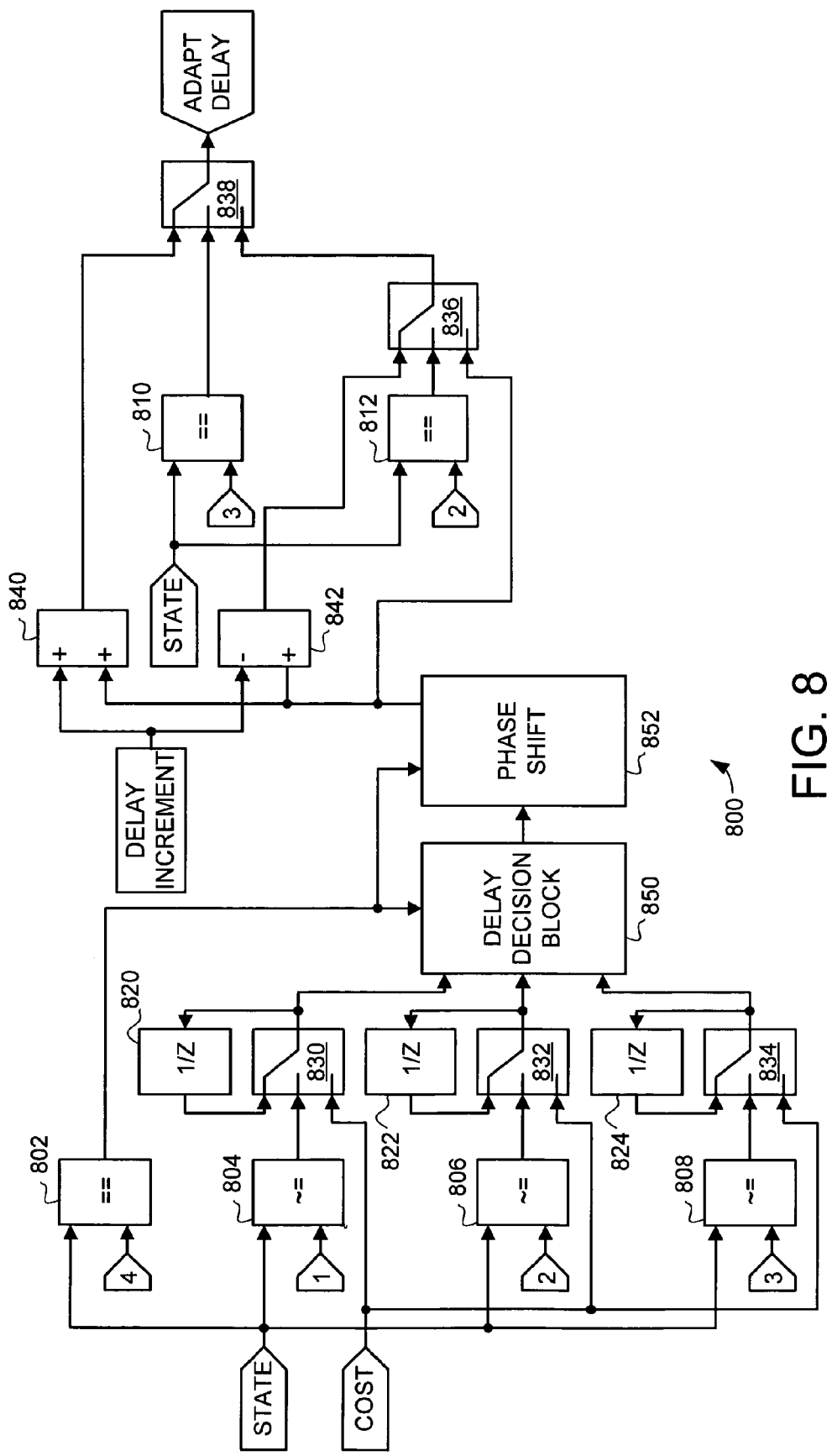
FIG. 8 is a schematic view of an exemplary embodiment of fuel flow phase determination.
Figure 9:
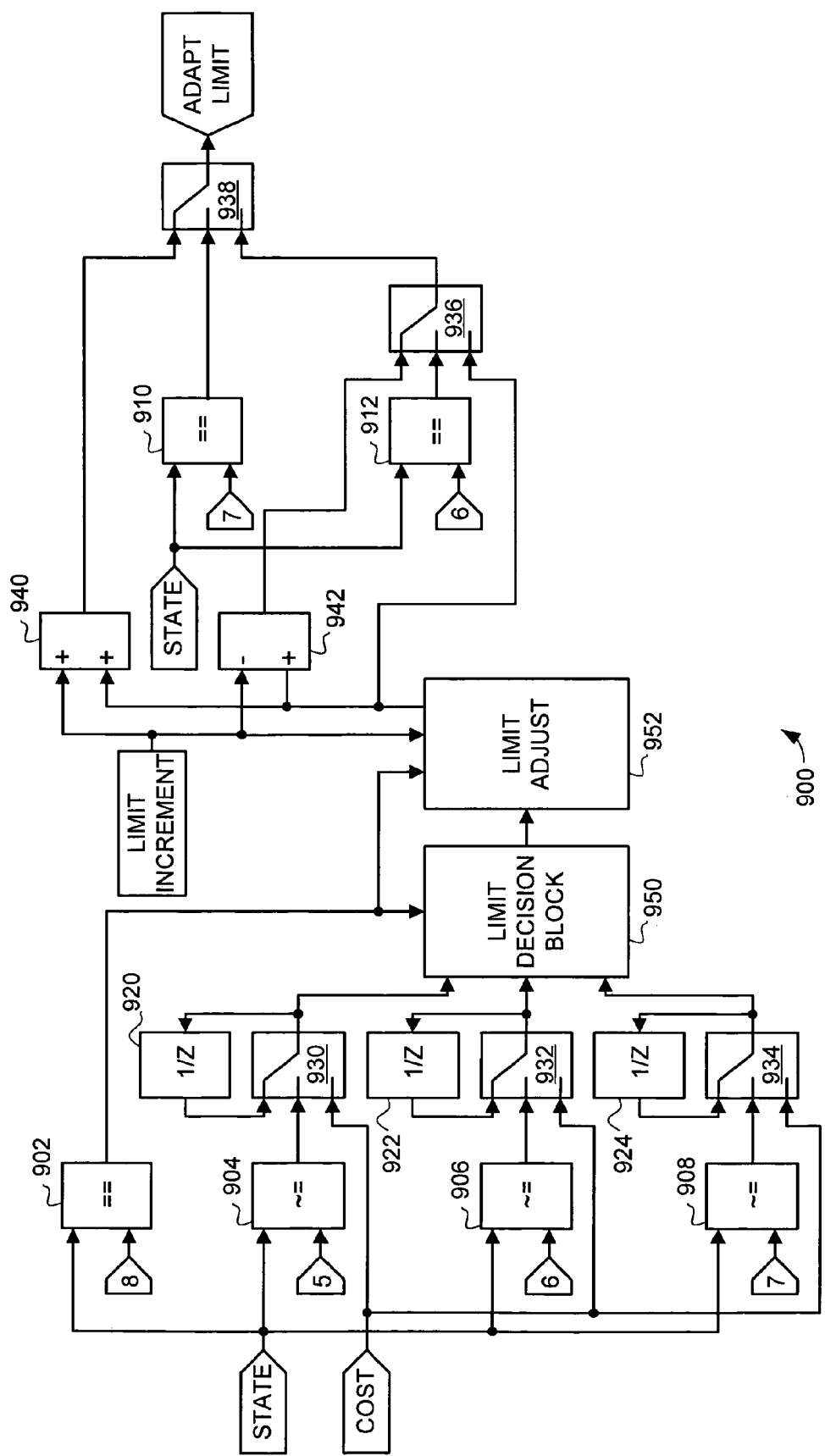
FIG. 9 is a schematic view of an exemplary embodiment of fuel flow magnitude determination.

Specifically, the cost is passed to the fuel flow phase determination and fuel flow magnitude determination and used as a basis for generating the adapt delay and adapt limit signals, which are used to create the command signal as discussed above. Turning now to FIGS. 8 and 9, an exemplary fuel flow phase determination 800 and exemplary fuel flow magnitude determination 900 are illustrated schematically. The fuel flow phase determination 800 and fuel flow magnitude determination 900 are exemplary of the type of devices that can be used in the combustion controller 400.

The fuel flow phase determination 800 and fuel flow magnitude determination 900 are state machine driven mechanisms, with the operation of the mechanism determined by the current state, where the state is switched according to a defined pattern. In general, the states progress in numerical order from 1 to 8 and then repeat starting at state 1. One specific example of this, including the timing between states will be discussed with reference to FIG. 10.

A detailed discussion of the fuel flow phase determination 800 follows. In general, the fuel flow phase determination 800 receives the cost signal and generates an adapt delay signal, which is passed to the valve control logic and determines the phase of the modulated fuel flow. The fuel flow phase determination 800 alternatively perturbs the delay, increasing and decreasing the delay, and compares the costs of the perturbed delays and the current delay. From this, the fuel flow determination 800 adjusts the adapt delay signal. This process is performed in states 1-4, and is repeated each cycle. Thus, the fuel flow determination 800 continually adjusts the adapt delay signal, and hence the phase of the modulated fuel flow.

The fuel flow phase determination 800 includes comparators 802, 804, 806, 808, 810 and 812, storage blocks 820, 822, and 824, switches 830, 832, 834, 836 and 838, summing junctions 840 and 842, delay decision block 850 and phase shift 852. The current state is passed to the comparators 802, 804, 806, 808, 810 and 812. Those comparators compare the current state to a specific value and produce an appropriate output. For example, comparator 802 compares the current state to, and if the current state is equal to 4 asserts its output. Comparators 810 and 812 operate similarly. Comparator 804 compares the current state to 1, and if the current state is NOT equal to 1, asserts it output. Comparators 806 and 808 operate similarly.

The cost is received and passed to switches 830, 832 and 834. The switches 830, 832 and 834, together function with storage blocks 820, 822 and 824 to selectively capture, hold and pass the received cost values. When the state is equal to 1, the output of the comparator 804 is not asserted and the cost input is passed through switch 830, to the delay decision block 850, and is fed into storage block 820. Thus when the state is equal to 1 the new cost is passed to the output (and into the storage block 820 input). When the state is not equal to one, the output of comparator 804 is asserted and the switch 830 input is coupled to storage block 820. In this configuration the output of the switch 830 holds it previous value. Thus, in one state the output of switch 830 is updated with new cost values, and in the other states the output of switch 830 holds the previous cost values.

Switch 832 and switching block 822, and switch 834 and switching block 824 operate in the same manner, except that they respectively are updated during states 2 and 3 and hold otherwise. Thus, the switches operate to selectively update and hold three cost values, with these three cost values passed to the delay decision block 850. This allows the delay decision block 850 to receive and compare the costs associated with three different adapt phase adjustments.

Specifically, the delay decision block 850 receives the three cost values in states 1, 2 and 3. As will be explained in greater detail below, these three cost values correspond to a cost at the current delay value, a cost with an increased delay, and a cost with a decreased delay. When state 4 is reached the output of comparator 802 triggers the delay decision block 850 to compare the three stored cost values. Specifically, delay decision block 850 compares these thee cost values to determine what, if any, adjustment to the delay is preferable to reduce the cost. Specifically, the delay decision block 850 determines if an increase or decrease in delay will reduce the cost value. If an increase or decrease in delay will reduce the cost, then that change in the delay is selected for the next iteration. If an increase or decrease is not determined to reduce the cost then the current delay is maintained. The delay decision block 850 would typically be implemented as a logic circuit that is designed to receive the three cost values, compare the values, and control the phase shift block 852 to adjust the phase accordingly. One example technique for comparing costs will be discussed in greater detail below with reference to FIG. 11.

The delay decision block 850 controls the phase shift 852. The phase shift 852 provides the adapt delay signal that determines the phase shift of the modulated fuel flow. Specifically, the output of the phase shift 852 is the current value of the delay as represented by the adapt delay signal. After the comparison of costs during state 4, the delay decision block 850 tells the phase shift 852 whether to keep the current delay at the adapt delay signal, or whether to increment or decrement the adapt delay signal. The phase shift 852 would typically be implemented with a logic circuit designed adjust the phase by adding to or subtracting from the current delay.

The delay increment input, comparators 810 and 812, summing junctions 840 and 842, and switches 836 and 838 function to adjust the phase of the command signal by alternatively increasing and decreasing the delay of the adapt delay signal. During times when it is not state 2 or 3 the outputs of comparator 810 and 812 are not asserted. This causes the output of phase shift to be passed through switches 836 and 838 as the adapt delay signal.

The output of phase shift 852 is also passed to the summing junctions 840 and 842. Summing junction 840 adds a delay increment to the phase shift 852 output, while summing junction 842 subtracts the delay increment from the phase shift 852 output. The delay increment is thus the step size for the adapt delay signal.

During state 2 the output of comparator 812 is asserted. This causes the output of the summing junction 842 to be passed as the adapt delay signal. Thus, during state 2 the adapt delay signal will comprise the current delay (the phase shift 852 output) minus the delay increment. During state 3 the output of the comparator 810 is asserted. This causes the output of summing junction 840 to be passed as the adapt delay signal. Thus, during state 3 the adapt delay signal will comprise the current delay plus the delay increment.

Thus, during states 2 and 3 the delay, and hence the phase of the command signal, is perturbed in both directions. The resulting change in cost is received by the delay decision block 850 through switches 832 and 834, where the costs are compared during state 4. Based on the comparison, the delay decision block 850 controls phase shift 852, determining whether to keep the current delay as the adapt delay signal, or whether to increment or decrement the adapt delay signal.

Thus, during each set of states 1-4 the fuel flow phase determination 800 receives the cost signal and alternatively perturbs the delay, increasing and decreasing the delay, and compares the costs of the perturbed delays and the current delay. From this, the fuel flow determination 800 adjusts the adapt delay signal.

The fuel flow magnitude determination 900 operates in a manner similar to the fuel flow phase determination 900, with adjustments to the magnitude and cost comparisons occurring in states 5-8. A detailed discussion of the fuel flow magnitude determination 900 follows. In general, the fuel flow magnitude determination 900 receives the cost signal and generates an adapt limit signal, which is passed to the valve control logic and determines the magnitude of the modulated fuel flow. The fuel flow magnitude determination 900 alternatively perturbs the magnitude, increasing and decreasing the magnitude, and compares the costs of the perturbed magnitudes and the current magnitude. From this, the fuel flow determination 900 adjusts the adapt limit signal. This process is performed in states 5-8, and is repeated each cycle. Thus, the fuel flow magnitude determination 900 continually adjusts the adapt limit signal, and hence the magnitude of the modulated fuel flow.

The fuel flow magnitude determination 900 includes comparators 902, 904, 906, 908, 910 and 912, storage blocks 920, 922, and 924, switches 930, 932, 934, 936 and 938, summing junctions 940 and 942, limit decision block 950 and limit adjust 952. The current state is passed to the comparators 902, 904, 906, 908, 910 and 912. Those comparators compare the current state to a specific value and produce an appropriate output. For example, comparator 902 compares the current state to 8, and if the current state is equal to 8 asserts its output. Comparators 910 and 912 operate similarly. Comparator 904 compares the current state to 5, and if the current state is NOT equal to 5, asserts it output. Comparators 906 and 908 operate similarly.

The cost is received and passed to switches 930, 932 and 934. The switches 930, 932 and 934, together function with switching blocks 920, 922 and 924 to selectively capture, hold and pass the received cost values. When the state is equal to 5, the output of the comparator 904 is not asserted and the cost input is passed through switch 930, to the limit decision block 950, and is fed back through storage block 920. Thus when the state is equal to 5 the new cost is passed to the output. When the state is not equal to 5, the output of comparator 904 is asserted and the switch 930 input is coupled to storage block 920. In this configuration the output of the switch 930 holds it previous value. Thus, in one state the output of switch 930 is updated with new cost values, and in the other states the output of switch 930 holds the previous cost values.

Switch 932 and switching block 922, and switch 934 and switching block 924 operate in the same manner, except that they respectively are updated during states 6 and 7 and hold otherwise. Thus, the switches operate to selectively update and hold three cost values, with these three cost values passed to the limit decision block 950. This allows the limit decision block 950 to receive and compare the costs associated with three different adapt limit adjustments.

Specifically, the decision block 950 receives the three cost values in states 5, 6 and 7. As will be explained in greater detail below, these three cost values correspond to a cost at the current limit value, a cost with an increased limit, and a cost with a decreased limit. When state 8 is reached the output of comparator 902 triggers the decision block 950 to compare the three stored cost values. Specifically, limit decision block 950 compares these three cost values to determine what, if any, adjustment to the limits is preferable to reduce the cost. Specifically, the decision block determines if an increase or decrease in the limits will reduce the cost value. If an increase or decrease in limits will reduce the cost, then that change in the limit is selected for the next iteration. If an increase or decrease is not determined to reduce the cost then the current limits are maintained. The limit decision block 950 would typically be implemented as a logic circuit that is designed to receive the three cost values, compare the values, and control the limit adjust block 952 to adjust the magnitude accordingly. Again, one example technique for comparing costs will be discussed in greater detail below with reference to FIG. 11.

The limit decision block 950 controls the limit adjust 952. The limit adjust 952 provides the adapt limit signal that determines the magnitude of the modulated fuel flow. Specifically, the output of the limit shift 952 is the current value of the magnitude as represented by the adapt limit signal. After the comparison of costs during state 8, the limit decision block 950 tells the limit adjust 952 whether to keep the current limit as the adapt limit signal, or whether to increment or decrement the adapt limit signal. The limit adjust 952 would typically be implemented with a logic circuit designed adjust the magnitude by adding to or subtracting from the current limits.

The limit increment input, comparators 910 and 912, summing junctions 940 and 942, and switches 936 and 938 function to adjust the magnitude of the command signal by alternatively increasing and decreasing the limits of the adapt limit signal. During times when it is not state 6 or 7 the outputs of comparators 910 and 912 are not asserted. This causes the output of limit adjust 952 to be passed through switches 936 and 938 as the adapt limit signal.

The output of limit adjust 952 is also passed to the summing junctions 940 and 942. Summing junction 940 adds a limit increment to the limit shift 952 output, while summing junction 942 subtracts the limit increment from the limit shift 952 output. The limit increment is thus the step size for the adapt limit signal.

During state 6 the output of comparator 912 is asserted. This causes the output of the summing junction 942 to be passed as the adapt limit signal. Thus, during state 6 the adapt limit signal will comprise the current limit (the limit adjust 952 output) minus the limit increment. During state 7 the output of the comparator 910 is asserted. This causes the output of summing junction 940 to be passed as the adapt limit signal. Thus, during state 7 the adapt limit signal will comprise the current limit plus the limit increment.

Thus, during states 6 and 7 the limits, and hence the magnitude of the command signal, is perturbed in both directions. The resulting change is cost in received by the limit decision block 950 through switches 932 and 934, where the costs are compared during state 8. Based on the comparison, the limit decision block 950 controls limit shift 952, determining whether to keep the current limits as the adapt limit signal, or whether to increment or decrement the adapt limit signal.

Thus, during each set of states 5-8 the fuel flow magnitude determination 900 receives the cost signal and alternatively perturbs the limits, increasing and decreasing the limits, and compares the costs of the perturbed limits and the current limit. From this, the fuel flow determination 900 adjusts the adapt limit signal.

Thus, the fuel flow phase determination 800 and fuel flow magnitude determination 900 each work to adaptively adjust the phase and magnitude of the modulated fuel flow in such a way as to reduce combustion instabilities in a turbine engine.

Turning briefly to FIG. 10, a timing table 1000 illustrates exemplary states and the timing of transition between states for fuel flow phase determination 800 and fuel flow magnitude determination 900. Specifically, the table includes states 1-8, with transitions between states occurring at 2 seconds, 4 seconds, 6, seconds, 6.0004 seconds, 8.0004 seconds, 10.0004 seconds, 12.0004 seconds, and 12.0008 seconds. Thus transitions between state 1 to 4 occur at two second intervals, the transition between 4 and 5 occurs after 0.0004 seconds have elapsed since the transition to 4. Then the transitions between states 5 to 8 occur at two second intervals, and the transition between 8 and 1 occurs 0.0004 seconds after the transition to 8. This timing pattern for transition between states 1-8 provides enough time to provide a fuel flow command with no time delay adjustment (state 1), a negative time delay adjustment (state 2), and positive time delay adjustment (state 3) to change the cost after sufficient information has been gathered to make an effective analysis. Note that the time in state 4 is relatively short, only enough time to process the information and make the decision. States 5-7 are the same except for the fuel flow command limits and state 8 is once again long enough to allow processing of the information collected in states 5-7 and to make the adjustment Turning now to FIG. 11, a table 1100 illustrates one specific technique for comparing costs. The technique illustrated in table 1100 can be used by delay decision block 850 and limit decision block 950 for comparing the costs associated with changes in phase and magnitude of the fuel flow. The table 1100 shows four cases, with each of the four cases having a different cost perturbation profile for the adaptive parameter, where the adaptive parameter comprises the adapt delay for phase adjustment and the adapt limits for magnitude adjustment. Each perturbation profile is a representation of three cost values C, the cost with the adaptive parameter decreased (−t), the cost with the adaptive parameter at the current value (t), and the cost with the adaptive parameter increased (+t). These three cost values C correspond to the cost values that would be received by the decision blocks for the current value of the adapt delay or adapt limit, and for the cost values that would be received for increasing and decreasing the adapt delay or adapt limit.

In case 1 the cost decreases as the adaptive parameter is increased. In this case it is thus desirable to increase the adaptive parameter. In case 2 the cost increases as the adaptive parameter is increased. In this case it is thus desirable to decrease the adaptive parameter. In case 3 the cost increases both as the adaptive parameter increases or decreases. Thus, in this case it I desirable not to change the adaptive parameter. In case 4, the cost decreases both as the adaptive parameter increases or decreases. In this cases it cannot be reliably determined which change in parameter is the desirable change. Thus, in case 4 the decision is to not change the parameter. It should be noted that this is just one example decision that could be made in case 4. In some applications it may be desirable to select a change in parameter based on some other factor in case 4.

Thus, table 1100 illustrates a decision matrix that can be used to compare the costs associated with three different delays or limits and determine what change is desirable in those delays or limits. When implemented in a delay decision block or limit decision block the decision matrix will lead the adaptive combustion controller to reduce the cost, and thus reduce the combustion instabilities in the turbine engine.

The present invention thus provides an adaptive combustion controller and method for a turbine engine. The adaptive combustion controller and method modulates the fuel flow to the turbine engine combustor to reduce combustion instabilities. In particular, the adaptive combustion controller includes a fuel flow phase controller and a fuel flow magnitude controller. The adaptive combustion controller receives sensor data from the turbine engine. In response to the sensor data the fuel flow phase controller adjusts the phase of the modulated fuel flow to reduce instabilities in the combustor. Likewise, in response to the sensor data the fuel flow magnitude controller adjusts the magnitude of the modulated fuel flow to further reduce the instabilities in the combustor. By modulating the fuel flow to the combustor, and adaptively adjusting the phase and magnitude of the modulated fuel flow, the adaptive combustion controller is able to effectively reduce combustion instabilities in the turbine engine. Furthermore, the adaptive combustion controller is able to modulate the fuel flow without changing the overall amount of fuel delivered to the turbine engine. Thus, the adaptive combustion controller is able to reduce combustion instabilities without requiring a change in fuel consumption or engine speed of the turbine engine.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. An adaptive combustion controller for a turbine engine, the adaptive combustion controller receiving sensor data from a combustor in the turbine engine, the adaptive combustion controller comprising:
   a fuel flow phase controller, the fuel flow phase controller adjusting a phase of a modulated fuel flow to the combustor responsive to the sensor data to reduce combustion instabilities in the combustor in the turbine engine, wherein the fuel flow phase controller determines a cost of increasing delay in the phase of modulated fuel flow and determines a cost of decreasing delay in the phase of modulated fuel flow, wherein the cost comprises a measure of instabilities in the turbine engine; and
   a fuel flow magnitude controller, the fuel flow magnitude controller adjusting a magnitude of the modulated fuel flow to the combustor responsive to the sensor data to reduce the combustion instabilities in the combustor in the turbine engine.

2. The controller of claim 1 wherein the sensor data comprises pressure data from the combustor.

3. An adaptive combustion controller for a turbine engine, the adaptive combustion controller receiving sensor data from a combustor in the turbine engine, the adaptive combustion controller comprising:
   a fuel flow phase controller, the fuel flow phase controller adjusting a phase of a modulated fuel flow to the combustor responsive to the sensor data to reduce combustion instabilities in the combustor in the turbine engine, wherein the fuel flow phase controller adjusts the phase of the modulated fuel flow by determining a current cost, dynamically increasing delay in the phase of the modulated fuel flow and determining a first cost of increasing delay, and dynamically decreasing the delay in the phase of the modulated fuel flow and determining a second cost of decreasing delay and comparing the current cost, first cost and second cost to determine how to adjust the phase of the modulated fuel flow; and
   a fuel flow magnitude controller, the fuel flow magnitude controller adjusting a magnitude of the modulated fuel flow to the combustor responsive to the sensor data to reduce the combustion instabilities in the combustor in the turbine engine.

4. An adaptive combustion controller for a turbine engine, the adaptive combustion controller receiving sensor data from a combustor in the turbine engine, the adaptive combustion controller comprising:
   a fuel flow phase controller, the fuel flow phase controller adjusting a phase of a modulated fuel flow to the combustor responsive to the sensor data to reduce combustion instabilities in the combustor in the turbine engine; and
   a fuel flow magnitude controller, the fuel flow magnitude controller adjusting a magnitude of the modulated fuel flow to the combustor responsive to the sensor data to reduce the combustion instabilities in the combustor in the turbine engine, wherein the fuel flow magnitude controller determines a cost of increasing a magnitude of the modulated fuel flow and determines a cost of decreasing the magnitude of modulated fuel flow.

5. An adaptive combustion controller for a turbine engine, the adaptive combustion controller receiving sensor data from a combustor in the turbine engine, the adaptive combustion controller comprising:
- a fuel flow phase controller, the fuel flow phase controller adjusting a phase of a modulated fuel flow to the combustor responsive to the sensor data to reduce combustion instabilities in the combustor in the turbine engine; and
- a fuel flow magnitude controller, the fuel flow magnitude controller adjusting a magnitude of the modulated fuel flow to the combustor responsive to the sensor data to reduce the combustion instabilities in the combustor in the turbine engine, wherein the fuel flow magnitude controller adjusts the magnitude of the modulated fuel flow by determining a current cost, dynamically increasing the magnitude of the modulated fuel flow and determining a first cost of increasing the magnitude, and dynamically decreasing the magnitude of the modulated fuel flow and determining a second cost of decreasing the magnitude of the modulated fuel flow and comparing the current cost, first cost and second cost to determine how to adjust the magnitude of the modulate fuel flow.

6. An adaptive combustion controller for a turbine engine, the adaptive combustion controller comprising:
- a variation detector, the variation detector receiving the sensor data from a combustor in the turbine engine and determining a sensor data variation;
- a cost generator, the cost generator receiving the sensor data variation and generating a cost, the cost comprising a measure of combustion instabilities in the turbine engine;
- valve control logic, the valve control logic modulating fuel flow to the combustor in the turbine engine,
- a fuel flow phase determination mechanism coupled to the valve control logic, the fuel flow phase determination mechanism dynamically increasing delay in the phase of the modulated fuel flow, dynamically decreasing the delay in the phase of the modulated fuel flow, and comparing a cost at a current delay, a cost at the increased delay, and a cost at the decreased delay, the fuel flow phase determination adjusting the phase of the modulated fuel flow based on the cost comparing; and
- a fuel flow magnitude determination mechanism coupled to the valve control logic, the fuel flow magnitude determination mechanism dynamically increasing a magnitude of the modulated fuel flow, dynamically decreasing the magnitude of the modulated fuel flow, and comparing a cost at a current magnitude, a cost at the increased magnitude, and a cost at the decreased magnitude, the fuel flow magnitude determination adjusting the magnitude of the modulated fuel flow based on the cost comparing.

7. The controller of claim 6 wherein the sensor data comprises pressure data and wherein the sensor data variation comprises pressure variation.

8. The controller of claim 6 wherein the valve control logic is coupled to the variation detector through a filter path, the filter path including at least one filter filtering the sensor data variation to isolate a frequency band of interest sensor data variation.

9. The controller of claim 8 wherein the frequency band of interest comprises a resonant frequency in the combustor of the turbine engine.

10. The controller of claim 8 wherein the valve control logic is coupled to the variation detector through a second filter path, the second filter path including at least one filter filtering the sensor data variation to isolate a second frequency band of interest sensor data variation, the second frequency band of interest distinct from the frequency band of interest.

11. The controller of claim 6 wherein the cost generator generates a cost using an anti-log function.

* * * * *